United States Patent [19]
Canterberry et al.

[11] Patent Number: 5,765,866
[45] Date of Patent: Jun. 16, 1998

[54] AIRBAG INFLATOR EMPLOYING GAS GENERATING COMPOSITIONS CONTAINING MICA

[75] Inventors: J B Canterberry, Apollo Beach; Samuel Steven Schlueter, Plant City; John Herman Adams; Robert Keith Walsh, both of Lakeland; Dennis Alvin Trevillyan, Plant City, all of Fla.

[73] Assignee: Breed Automotive Technology, Inc., Lakeland, Fla.

[21] Appl. No.: 801,332

[22] Filed: Feb. 19, 1997

[51] Int. Cl.⁶ ............................................. B60R 21/28
[52] U.S. Cl. ........................................................ 280/741
[58] Field of Search .......................................... 280/741

[56] References Cited

U.S. PATENT DOCUMENTS

| | | | |
|---|---|---|---|
| 3,834,955 | 9/1974 | Fox et al. | 149/7 |
| 5,016,914 | 5/1991 | Faigle et al. | 280/741 |
| 5,035,757 | 7/1991 | Poole | 149/46 |
| 5,139,588 | 8/1992 | Poole | 149/61 |
| 5,221,107 | 6/1993 | O'Loughlin | 280/736 |
| 5,388,859 | 2/1995 | Fischer et al. | 280/737 |
| 5,411,290 | 5/1995 | Chan et al. | 280/741 |
| 5,447,105 | 9/1995 | Bauer et al. | 280/741 |
| 5,460,668 | 10/1995 | Lyon | 149/36 |
| 5,467,715 | 11/1995 | Taylor et al. | 102/289 |
| 5,472,535 | 12/1995 | Mendenhall et al. | 149/36 |
| 5,480,185 | 1/1996 | Lowe et al. | 280/741 |
| 5,492,366 | 2/1996 | Osborne et al. | 280/741 |
| 5,518,054 | 5/1996 | Mitson et al. | 149/35 |
| 5,628,528 | 5/1997 | DeSautelle et al. | 280/741 |

Primary Examiner—Edward A. Miller
Attorney, Agent, or Firm—L. R. Drayer; D. O. Nickey

[57] ABSTRACT

An airbag inflators employ gas generating compositions formed from a fuel, one or more oxidizers and mica. The gas generant composition employed in the airbag inflators yields solid combustion products and inflating gases having a reduced content of undesirable gases such as $NO_x$ and CO.

13 Claims, 4 Drawing Sheets

AIRBAG INFLATOR EMPLOYING GAS GENERATING COMPOSITIONS CONTAINING MICA

TECHNICAL FIELD

The present invention generally relates to novel gas generating devices used for inflating occupant safety restraints in motor vehicles. More specifically, this invention relates to airbag inflators employing gas generants that contain up to 25% by weight mica, which produce combustion products having acceptable levels of undesirable substances. The invention also relates to a novel inflator housing that uses a stainless steel burst foil.

BACKGROUND OF THE INVENTION

Inflatable occupant restraint devices for motor vehicles have been under development worldwide for many years. Gas generating compositions for inflating the occupant restraint devices have also been under development for many years and numerous patents have been granted thereon. Because the inflating gases produced by the gas generants must meet strict toxicity requirements, most, if not all gas generants now in use, are based on alkali or alkaline earth metal azides. Sodium azide is presently the preferred fuel for gas generant compositions as it reacts with oxidizing agents to form a relatively non-toxic gas consisting primarily of nitrogen.

A major problem associated with azide based gas generants is the extreme toxicity of the azide itself. The toxicity of the azide based generants makes their use inherently difficult and relatively expensive. In addition, the potential hazard and disposal problems of unfired inflation devices containing azide based generants must be considered.

In contrast the non-azide based gas generants (i.e., 5-aminotetrazole) provide significant advantages over the azide based gas generants with respect to hazards during manufacture and disposal. Unfortunately, the non-azide based gas generants heretofore known produce unacceptably high levels of undesirable substances upon combustion. The most difficult undesirable gases to control are the various oxides of nitrogen ($NO_x$) and carbon monoxide (CO). An additional problem associated with non-azide based gas generants is the significantly higher combustion temperature relative to the azide based generants.

Gas generants which contain metallic compositions, upon combustion, produce solid particles or what is generally referred to as "slag" or "clinkers" which must be filtered from the combustion gas prior to inflation of the airbag. The ability of a gas generant to form an easily filterable slag is of great advantage when the gases are used for inflation purposes, especially when the gases must be filtered for the inflation of an automobile airbag.

The reduction of the level of undesirable gases upon combustion of non-azide gas generants and the formation of solid combustion particles (slag) requires a special combination of materials. For instance, manipulation of the oxidizer/fuel ratio reduces either the $NO_x$ or CO. More specifically, increasing the ratio of oxidizer to fuel minimizes the CO content upon combustion because the extra oxygen oxidizes the CO to carbon dioxide. Unfortunately, this approach results in increased amounts of $NO_x$. The relatively high levels of $NO_x$ and CO produced upon combustion of non-azide gas generants and the difficulty presented in forming easily filterable solid combustion products is due, in part, to the relatively high combustion temperatures exhibited by the non-azide gas generants. For example, the combustion temperature of a sodium azide/iron oxide composition can range from about 1,200° C. to about 1,900° C., while the non-azide gas generants exhibit combustion temperatures as high as 2,800° C. Utilizing lower energy fuels to reduce the combustion temperature is ineffective because the lower energy fuels do not provide a sufficiently high rate of gas generation, or burn rate, for use in vehicle restraint systems. Adequate burn rate of the gas generant is required to ensure that the airbag system will operate readily and properly.

The aforementioned problems are solved by the present invention which discloses gas generants that contain from 5–25% by wt. mica. The gas generants of this invention yield easily filterable combustion products and further produce inflating gases at a desired high burn rate while reducing the production of undesired gases. More specifically, this invention relates to airbag inflators employing non-azide based gas generants that contain up to about 25% by wt. mica.

BACKGROUND ART

U.S. Pat. No. 5,460,668 to Lyon teaches non-azide gas generating compositions that contain a heat absorbing additive selected from Pyrex®, Vycor®, alkaline earth alumino silicates, aluminosilicates, baria alumina borosilicates, fused silica, and barium alumino borosilicates. This patent primarily is concerned with the use of a heat absorbing additive comprising glass powders. The glass powders suggested by this patent soften at combustion temperatures thereby absorbing heat and reducing peak combustion temperatures. In contrast, the mica used in the present invention is a crystalline material that decomposes at about 500° C.

U.S. Pat. No. 5,467,715 to Taylor et al. teaches a gas generant composition comprising between about 20 and about 40 wt. % of fuel, said fuel comprising a tetrazole and/or triazole compound at between about 50 and about 85 wt. % of said fuel and a water soluble fuel at between 15 and about 50 wt. % of said fuel. This patent also suggests that it is frequently desirable to pelletize the gas generant compositions. This patent teaches that up to about 5 wt. %, typically 0.2 to 5 wt. % of a processing aid or binder, be employed in the formation of the pellets. This processing aid is selected from materials known to be useful for this purpose, including molybdenum disulfide, graphite, nitrocellulose, polyvinylpyrolidone, sodium silicate, zinc stearate, talc, mica minerals and others known to those skilled in the art. This patent does not suggest the use of mica at levels of from 5 to 25% by wt. of the gas generant to reduce undesirable gases and enhance the formation of slags.

U.S. Pat. No. 5,035,757 to Poole discloses a gas generating mixture useful for inflating an automobile crash bag, said pyrotechnique mixture comprising: (1) a fuel selected from a group of azole compounds; (2) an oxygen containing oxidizer; (3) a high temperature slag forming material selected from a group consisting of alkaline earth metal oxides, hydroxides, carbonates and oxalates; and (4) a low temperature slag forming a material selected from the group consisting of silicon dioxide, boric oxide, alkaline metal silicates and naturally occurring clays and talcs. This patent fails to suggest the use of mica which reduces the production particulates and noxious gases to levels that meet future performance standards.

U.S. Pat. 5,139,588 to Poole discloses a gas generating composition comprising: (1) a non-azide fuel; (2) an oxygen containing oxidizer; (3) an alkaline metal salt of an inorganic or organic acid such as 5-aminotetrazole; and (4) a low temperature slag forming material selected from clays, talcs and silica. This patent fails to suggest the use of mica in non-azide gas generant compositions to reduce the production of undesirable gases and to enhance the slag forming capabilities of the gas generant.

U.S. Pat. No. 5,518,054 to Mitson et al. relates to a gas generant composition which comprises a fuel and an oxidizer and a processing aid. This patent discloses the use of between 0.05 and about 2 wt. % of a processing aid comprising a mixture of mica and a salt of a fatty acid. This patent does not suggest the use of mica at levels from 5 to 25% by wt. in gas generants.

U.S. Pat. No. 3,834,955 to Fox et al. relates to explosive compositions comprising a major portion of at least one inorganic oxygen releasing salt characterized in that the salt is coated with an essentially complete coating of material comprising a hydrocarbon substance having hydrophobic or water repellent characteristics (i.e., asphalt). This patent goes on to suggest the use of anti-agglomeration agents such as finely divided clays, talcs or mica. This patent does not relate to gas generants for automobile safety systems, but rather to water resistant explosive compositions in particulate form that are used in blasting operations.

U.S. Pat. No. 5,388,859 to Fisher et al. discloses an airbag inflator with isolation membranes that extend across a diffuser chamber between discharge openings and gas outlet ports. The isolation membrane is welded to the housing to block conduction of moisture from the environment around the inflator and into the interior of the inflator. The isolation membrane has a weakened portion defined by a stress riser. When the inflator is actuated, the pressure of the gases flowing through the discharge openings breaks the isolation membrane at the stress riser and the isolation membrane moves to a second location clear of the gas outlet ports. This patent does not suggest the use of a stainless steel rupture or burst foil to hermetically seal the gas outlet ports and to reduce the amount of particulates and undesirable gases exiting the inflator.

SUMMARY OF THE INVENTION

A primary advantage of the new gas generant compositions of this invention is that reduced levels of undesirable gases are produced and the solid combustion products are easily filtered from the gas produced. The airbag inflator of this invention can use azide and/or non-azide fuels and preferably uses azoles or tetrazole salts as the fuel. A unique feature of this invention is the novel and unobvious use of mica. Also, the gas generant composition of this invention produces a high yield of gas which is required of modern inflators.

There is disclosed an airbag inflator system that contains gas generants which incorporate 5 to 25 wt. % mica. There is also discloses improved inflators which utilize a stainless steel burst foil which is adhered to the interior of the inflator housing and which hermetically seals the gas exit portals prior to activation of the inflator. This novel aspect of the invention assists in the production of a gas that is low in particulate matter and undesirable gases. The stainless steel foil can be from about 0.01 to about 0.20 mm in thickness. More preferably, the foil is about 0.025 to about 0.1 mm in thickness.

There is further disclosed an airbag inflator comprising a metal housing, knitted wire filter, a stainless steel burst foil having a thickness of 0.01 to 0.20 and a gas generant comprising 20–40 wt. % of a fuel selected from tetrazoles, triazoles and mixtures thereof, 20–80 wt. % of an oxidizer selected from transition metal oxides; alkali and alkaline earth metal nitrates, chlorates and perchlorates and mixtures thereof and 5–25 wt. % mica.

The mica containing gas generant compositions emploed with the airbag inflators of this invention are easily prepared, avoid the generation of substantial levels of undesirable gases and allows for the efficient filtering of solid materials generated during the combustion of the gas generant.

BRIEF DESCRIPTION OF THE DRAWINGS

The features of the present invention, which are believed to be novel, are set forth with particularity in the appended claims. The invention may be better understood by reference to the following description of the specific embodiments taken in conjunction with the accompanying drawings in which:

DETAILED DESCRIPTION OF THE INVENTION

Figure 1:
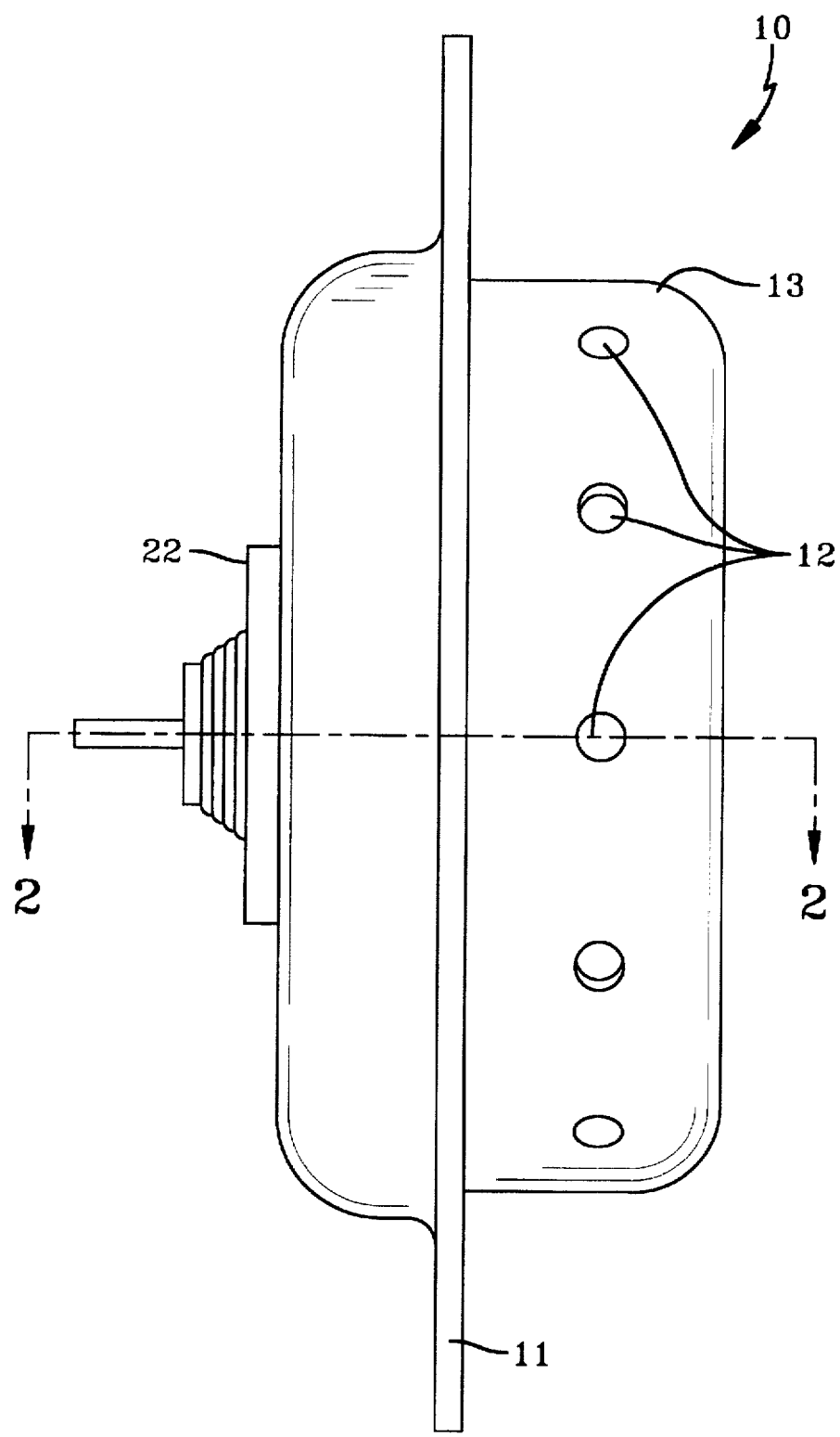
FIG. 1 is a side view of one embodiment of an airbag inflator of the present invention.

The gas generant formulations emploed with the airbag inflators of this invention may be formulated with any known fuel. Most inflators today use an azide, particularly sodium azide as the fuel. However, there is a desire to avoid the use of azide fuels and a number of other fuels have been proposed, including tetrazole, (i.e., 5-aminotetrazole), bitetrazole, mineral salts of tetrazoles, 1,2,4-triazole-5-one, nitrates, (i.e., guanidine nitrate and aminoguanidine nitrate) and the like. The fuel will typically comprise between about 15 and about 70 wt. % of the gas generant composition, while the oxidizer will typically comprise between about 20 and about 80 wt. % of the gas generant composition.

Processing aids, such as silicon dioxide, may also be used in the present invention. Those skilled in the art understand that depending upon the particular oxidizers and fuels utilized, certain processing aids have beneficial properties over others. Representative of processing aids useful in the present invention are silica TS-530 made by the Cabot Corporation of Tuscola, Ill., U.S.A.

Oxidizers useful in the composition of the present invention include the alkaline earth nitrates such as strontium nitrate. The alkali metal and alkali earth metal nitrates, chlorates and perchlorates are also useful oxidizers. Ammonium nitrate is also a useful oxidizer. The preferred oxidizer of the present invention is a mixture of strontium nitrate and potassium nitrate.

Mica is a name for a group of complex crystalline hydrous aluminum silicate minerals constructed of extremely thin cleavage flakes and characterized by near perfect basal cleavage, and a high degree of flexibility, elasticity, and toughness. The various micas, although structurally similar, vary in chemical composition. The properties of mica derive from the periodicity of weak chemical bonding alternating with strong bonding. Representative of the minerals of the mica group are muscovite, phlogopite, biotite, lepidolite and others such as fluorophlogopite. In general, the silicon to aluminum ratio is about 3:1. Any naturally occurring mica is useful in the gas generant composition of the present invention. However, those micas containing halogen atoms such as lepidolite and fluorophlogopite are not preferred. The presence of halogen atoms in certain of the mica group minerals may result in the production of combustion gases containing undesirable halogen ions. The mica useful in the composition employed with the airbag inflators of the present invention is typically a ground mica having a particle size ranging from 2 to 100 microns. This ground mica is also often referred to as flake mica. In the present invention mica with a particle size in the range of 2–25 microns is preferred.

Ground mica has been used as a paint extender which facilitates suspension, reduces checking and chalking, prevents shrinking of the film, increases resistance to water penetration and weathering, and brightens the tone of colored pigments. In the rubber industry ground mica has been used as a mineral filler and mold lubricant in the manufacture of molded rubber products such as tires. The uses in the plastics industry are similar where ground mica also acts as a reinforcing agent.

The gas generant composition according to this invention may optionally contain up to about 3 wt. %, typically between about 1 and about 2 wt. %, of a catalyst. Boron hydrides and iron ferricyanide are representative of such combustion catalysts.

The invention will now be described in greater detail by way of specific examples.

Referring first to FIG. 1, there is shown a diagrammatic side view of a representative vehicle airbag inflator 10. A mounting plate 11 is used to attach the inflator to a steering wheel, instrument panel or other suitable location in the vehicle. The airbag inflator 10 contains a composition 16 which generates gas when burned, and the generated gases exit the inflator via apertures 12 in the inflator housing 13. The inflator is activated by a signal from a crash sensor when a crash sensor (not shown) senses a crash of sufficient magnitude to require activation of the inflator 10.

Figure 2:
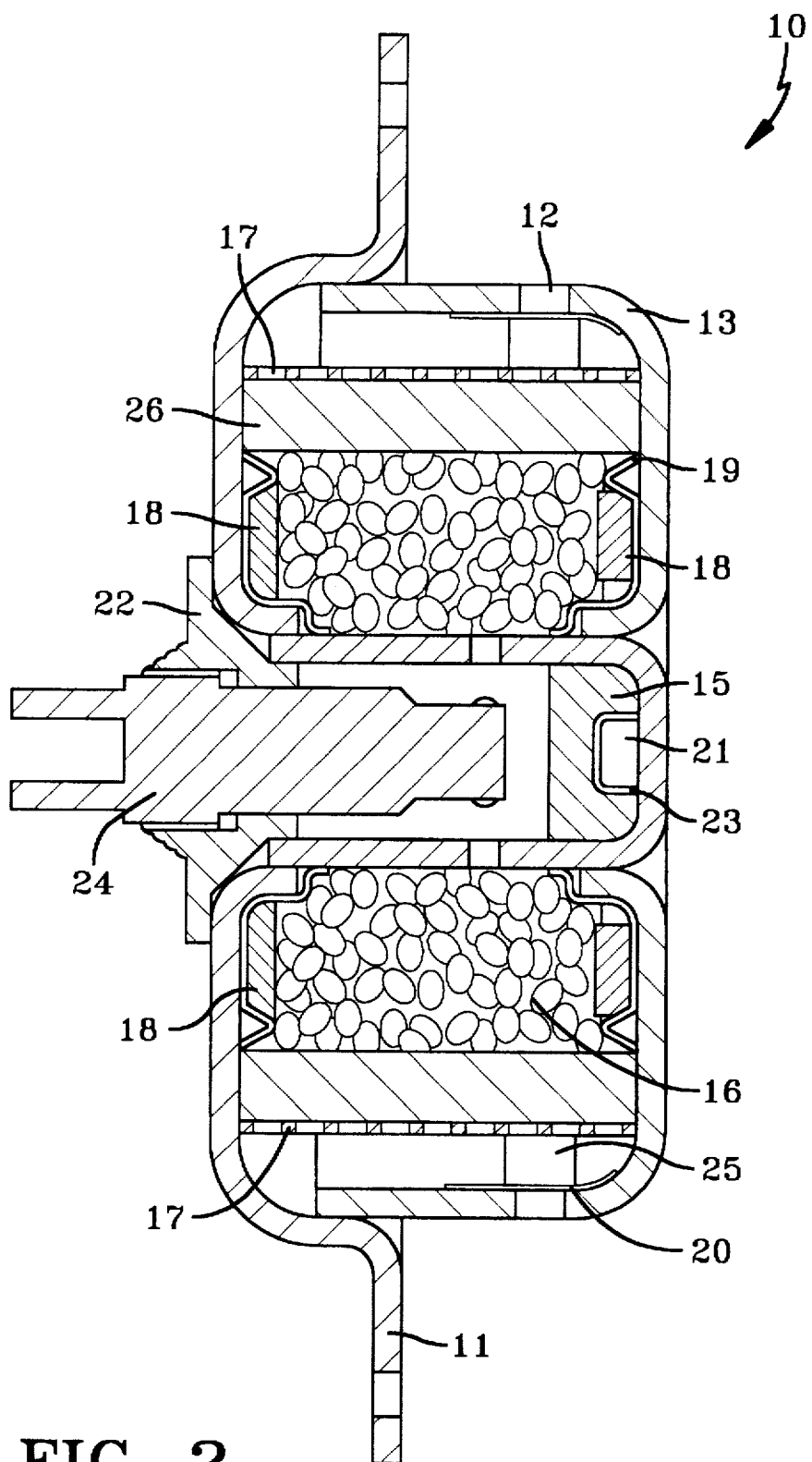
FIG. 2 is a cross section of the gas generating device of FIG. 1 taken along line 2—2.

Referring to FIG. 2 there is shown inflator 10 in a cross section taken along line 2—2 of FIG. 1. In accordance with one embodiment of this invention, a crash sensor 14 (not shown) closes an electrical circuit or initiates a firing signal which activates an initiator such as a squib 24 which ignites a booster composition 15, which in turn ignites the gas generating composition 16 according to the present invention. The igniter assembly 22 comprising the squib 24 and two electrodes is attached to the inflator housing through any useful means and is preferably attached via a weld. A preferred embodiment of this invention utilizes an inflator housing that is laser welded. As used herein, a "squib" is understood to be an electrical device having two electrodes insulated from one another and connected by a bridge wire. The bridge wire is preferably embedded in one or more layers of a pyrotechnic composition designed to give a flash of heat of sufficient intensity to ignite the booster composition 15. It is understood that various electrical, electronic, mechanical and electromechanical initiators known in the art, such as a stab initiator, can be used in the present invention. While any suitable booster composition 15 may be employed, the examples described herein employed $BKNO_3$ as a booster composition.

The gas generant 16 is ignited by the heat generated by the booster composition 15 and the resulting chemical reaction generates gas which passes through a knitted wire annular filter 26 and then through perforated annular tube 17. The knitted wire filter 26 and the perforated tube 17 are preferably made of stainless steel but low carbon steel may be employed. A knitted wire cushion 18 is used to protect the gas generant pellets. Backup ring 19 holds the wire cushion 18 and the wire filter 26 in place.

The combustion gases, after passing through knitted wire filter 26 and the perforated tube 17, enter an annular chamber 25. Apertures 12 in the housing 13 are sealed with stainless steel burst foil 20. When the pressure inside the chamber 25 exceeds a given value, the foil 20 ruptures and the gases escape the inflator 10 through apertures 12 which then inflate an airbag (not shown).

An autoignition substance 21 is in close proximity to the booster composition 15. The autoignition substance 21 is a composition which will spontaneously ignite at a preselected temperature and thereby ignite the booster composition 15 which will then ignite the gas generate 16. The gas generants which are used in the practice of this invention may react in a much more violent manner if the ambient temperature is elevated, for example, above about 175° C. (347° F.), so it is desirable to ignite the gas generant before such a violent reaction can occur. Autoignition retainer 23 secures the autoignition substance 21 against the interior wall of the metal housing 13 to assure that proper heat transfer occurs for the ignition of the autoignition substance 21 at the desired temperature.

Figure 4:
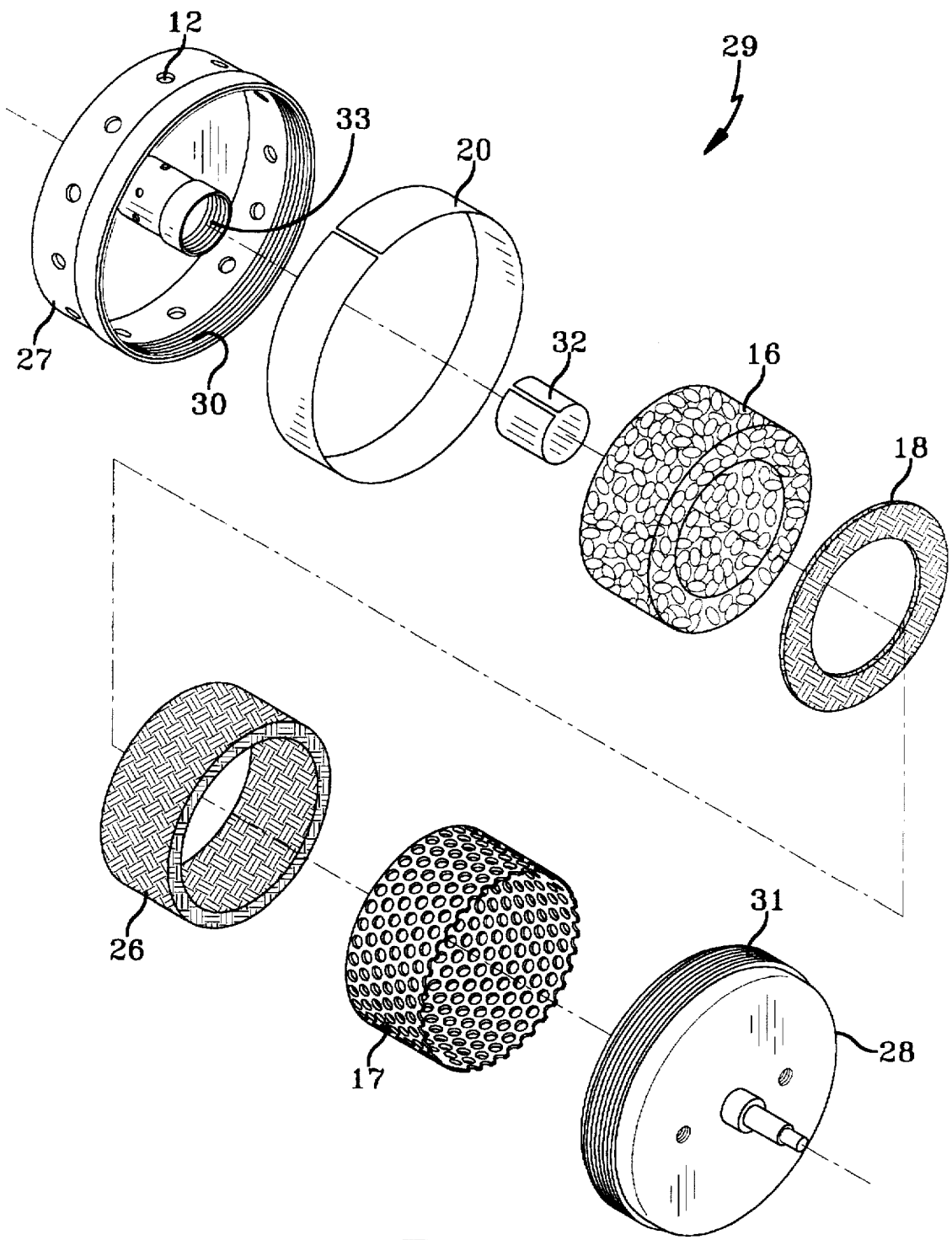
FIG. 4 is an exploded view of a reusable inflator used in the tests described herein.

Referring to FIG. 4, there is represented in exploded view, a reusable inflator 29 employed in testing the various gas generants disclosed in this application. In order to be reusable for testing purposes, the first and second housing members were threadably attached to one another rather than assembled by welds as shown in FIGS. 1 and 2. The inflator 29 comprises a first housing member 27 and a second housing member 28, both having circular configurations. The inner wall of the first housing member 27 has internal threads 30 which are secured to external threads 31 of the exterior wall of the second housing member 28. Preferably, the threads employed are buttress-type threads. An initiator (now shown) is disposed in the interior 33 of the center post and functions in a manner similar to squib 24 of FIG. 2 to ignite the gas generant 16. Metal foil 20, 32 lines the annular surfaces of the reaction chamber. An annular metal filter 26 and perforated annular tube 17 are disposed in the reaction chamber in the same manner as described with reference to FIG. 2.

EXAMPLE I

Preparation of Gas Generant

A one Kg batch of each of six gas generant compositions was formulated according to Table I below. The compositions were prepared by initially mixing all the components, except for the 5-aminotetrazole (5-AT), in a batch-type vibratory grinder (Sweco) for 120 minutes. The mica used was Micro Mica 3000 (muscovite) obtained from the Charles B. Chrystal Co., Inc. of New York, N.Y., U.S.A. It was a finely divided mica having a bulk density of about 12.4 lbs/cubic foot and a specific gravity of about 2.8.

TABLE I

Values in Weight %

| SAMPLE # | 5-AT | KNO₃ | Sr(NO₃)₂ | SiO₂** | CaCO₃ | CALCIUM BENTONITE | MICA* |
|---|---|---|---|---|---|---|---|
| 1 | 32 | 8 | 44 | 1 | — | — | 15 |
| 2 | 32 | 8 | 44 | — | — | — | 16 |
| 3 | 32 | 8 | 44 | 1 | — | 15 | — |
| 4 | 32 | 8 | 44 | 16 | — | — | — |
| 5 | 32 | 8 | 44 | 1 | 15 | — | — |
| 6 | 36.9 | 11.9 | 51.2 | 0.5 | — | — | — |

*= muscovite mica
**= Samples 1, 3, 5 and 6 used fumed silica as a partitioning agent, Sample 4 used 1% fumed silica and 15% microcrystalline silica as a slag former.

The 5-AT was then added to the grinder and the mixture was ground for an additional 120 minutes. The mixture was then placed in a plough-type mixer and about 15% by wt. water was added to form agglomerated materials that were then passed through a granulator with an 8 mesh screen.

The granules were placed on a tray and dried at 120° C. in an explosion proof oven for about 3 hours. The water content after drying was between 0.5 and 1% by weight. The dried granules were then passed through the granulator using a 20 mesh screen. The samples were then pelletized with a rotary pellet press. The pellets were about 5 mm in diameter, 1.2 mm high, weighed about 51 to 53 mg each and had a density as set forth in Table II.

TABLE II

Pellet Densities

| SAMPLE # | DENSITY g/cm³ |
|---|---|
| 1 | 2.16 |
| 2 | 2.18 |
| 3 | 2.16 |
| 4 | 2.13 |
| 5 | 2.17 |
| 6 | 2.14 |

As a specific example, Sample #1 was prepared by combining 2640 g of Sr(NO₃)₂ (44 wt. %), 480 gms of (KNO₃) (8 wt. %), 900 g of Micro Mica 3000 from the Charles B. Chrystal Co., Inc. of New York, N.Y., U.S.A. (15 wt. %) and 60 g of TS-530 Silica from Cabot Corporation of Tuscola, Ill., U.S.A. (1.0 wt. %) in a batch-type vibratory grinder containing ceramic media (Sweco) and the mixture was ground for 120 minutes. 1920 g of 5-AT (32 wt. %) was then added to the grinder and ground for an additional 120 minutes. At the end of the grinding operation the mean particle size of the mixture was from 5 to 10 microns. The addition of 1% silica facilitated the grinding operation as mixtures without the silica or other partitioning agents tend to clump or agglomerate within the grinder. However, it was later discovered that the use of a continuous type vibratory grinder (20U Palla Mill) from AAB Raymond Combustion Engineering, Inc. eliminated the need for the SiO₂ as a partitioning agent.

The ground material was then placed in a plow type mixer (Simpson) and combined with 887.5 g of water and mixed for about 3–5 minutes to produce an agglomerated material which was discharged to a granulator with an 8 mesh screen. The granulated material was then dried to about 0.5 to 1.0 wt. % water. The dried material was then processed in a granulator with a 20 mesh screen.

The dried and granulated composition was then pelletized in a rotary pellet press. The flat pellets or tablets were 5 mm in diameter and about 1.2 mm in height. The formed pellets from each Sample were then loaded into six steel inflators of the type shown in FIG. 4. About 43 gms of the pellets 16 were loaded into each of the steel housings. The housings also contained a stainless steel knitted wire slag filter 26 and pellet cushion 18, perforated stainless steel tube 17 and a stainless steel burst foil with a thickness of about 0.025 mm (0.001 inches). The burst foil or tape 20, 32 comprises a thin sheet of stainless steel with an adhesive on one side. The adhesive was a pressure sensitive adhesive known as 3M 9460PC VHB, manufactured by the 3M Co. of Minnesota, U.S.A. Other adhesives known to withstand temperatures of up to about 250° C., such as melt set adhesives, would be useful. The adhesive side of the burst foil is placed against the inside surface of the inflator housing so as to hermetically seal all apertures 12. The apertures 12 or exhaust ports for the gases generated by the generant was about 3.5 mm in diameter. The number of apertures 12 was twelve.

Those skilled in the art will appreciate that the number of required apertures and their diameter are related and various combinations of aperture number and diameter can be used successfully. The test inflator housing had a total volume of about 88 cm³, while the region of the housing located inwarly of the filter and containing the pellets of gas generating material had a volume of about 46 cm³. The inflator also incorporated about 1.0 g BKNO₃ as an enhancer and was associated with the initiator.

EXAMPLE II

Testing of Gas Generants

Particulates

The assembled inflators containing the various gas generants were evaluated in a 60 liter test tank fitted with equipment to record the pressure and time profile of the combustion and to analyze the gases exiting the inflator. The amount of particulate or slag produced by the burning generant was also determined. The inflators were installed into the tank and ignited. Immediately after firing of the inflator, gas samples were withdrawn from the tank for analysis by FTIR (Fourier Transform Infrared Spectroscopy).

Following venting of the tank to the atmosphere, the interior of the 60 liter tank was carefully scrubbed and rinsed with deionized water to measure particulate production. The particulate produced by gas generants comprises a mixture of water soluble and insoluble reaction products. The aqueous mixture of the soluble reaction products and the insoluble dust were then analyzed to determine total particulate production.

The inflators were also evaluated in a 100 cubic foot test chamber. This test is designed to simulate the interior volume of the standard automobile. Gas analysis and particulate analysis is also possible using this test. The test equipment consisted of a 100 cubic foot steel chamber containing a steering wheel simulator. To the chamber was attached a vacuum pump, a bubble flow meter, filters and a FT/IR gas analyzer (spectrophotometer). The inflator was attached to the simulated steering wheel assembly within the chamber, the chamber was sealed and the gas generant ignited. Gas samples were analyzed using an FTIR spectrometer at zero time and at 1, 5, 10, 15 and 20 minute intervals from ignition. Airborne particulate production can also be measured using the 100 cubic foot test chamber by filtering post-ignition air from the chamber through a fine filter and measuring the weight gained by the filter.

Table III sets forth the data collected for six (6) runs (A–F) for Samples 1 and 2 and for three (3) runs (A–C) for Samples 3, 4 and 5 in the 60 liter tank. Table III reports insoluble particulate in mgs, soluble particulate in mgs, total particulate in mgs and pH of the wash solution.

TABLE III

Particulate Production (60 liter tank)

| SAMPLE # | INSOLUBLE PARTICULATE IN MGS | SOLUBLE PARTICULATE IN MGS | TOTAL PARTICULATE IN MGS | pH OF THE WASH SOLUTION | AVERAGE TOTAL PARTICULATE MGS |
|---|---|---|---|---|---|
| 1-A | 496 | 640 | 1136 | 9.70 | 1221 |
| 1-B | 966 | 568 | 1533 | 10.15 | |
| 1-C | 605 | 594 | 1199 | 9.75 | |
| 1-D | 429 | 450 | 879 | 9.96 | |
| 1-E | 754 | 546 | 1300 | 10.06 | |
| 1-F | 654 | 626 | 1280 | 9.96 | |
| 2-A | 914 | 452 | 1366 | 10.19 | 1039 |
| 2-B | 612 | 428 | 1040 | 10.20 | |
| 2-C | 801 | 412 | 1213 | 10.30 | |
| 2-D | 547 | 360 | 907 | 10.26 | |
| 2-E | 644 | 442 | 1086 | 10.06 | |
| 2-F | 332 | 292 | 624 | 9.96 | |
| 3-A | 903 | 554 | 1457 | 10.23 | 1617 |
| 3-B | 1286 | 500 | 1786 | 10.29 | |
| 3-C | 963 | 646 | 1609 | 10.06 | |
| 4-A | 1585 | 790 | 2375 | 10.96 | 2270 |
| 4-B | 1631 | 756 | 2387 | 10.80 | |
| 4-C | 1361 | 688 | 2049 | 10.59 | |
| 5-A | 5333 | 1934 | 7267 | 11.86 | 4757 |
| 5-B | 1042 | 1532 | 2574 | 11.78 | |
| 5-C | 3082 | 1348 | 4430 | 11.63 | |
| 6-A | ND | ND | 4659 | 11.06 | 5319 |
| 6-B | ND | ND | 5600 | 11.08 | |
| 6-C | ND | ND | 5052 | 11.10 | |
| 6-D | ND | ND | 5413 | 11.20 | |
| 6-E | ND | ND | 5871 | 11.29 | |

These results indicate that mica, with or without silica as a processing aid, results in much cleaner effluent than Samples 3, 4, 5 and 6. The results for Samples 1 and 2 are not significantly different from each other, however, they are significantly different from the results produced by Samples 3, 4, 5 and 6. This data supports the benefits of a gas generant that contains mica.

Gaseous Reaction Products

The automotive industry is still developing standards for the gaseous reaction products of gas generants. It is interesting to note that perceived objectives for airbag inflator output vary somewhat between the United States and the automobile manufacturers of Europe. Table IV sets forth perceived desirable levels for the gases and particulates produced by generant compositions.

TABLE IV

Reaction Product Levels

| Reaction Product* | USA - less than | EUROPE - less than |
|---|---|---|
| Airborne Particulates | 41.7 | — |
| Carbon Monoxide | 188 | 200 |
| Carbon Dioxide | 2000 | 16667 |
| Benzene | 83.8 | — |
| Formaldehyde | 3.3 | 3.3 |
| Nitric Oxide | 16.7 | 16.7 |
| Nitrogen Dioxide | 3.3 | 3.3 |
| Ammonia | 50 | 50 |
| Hydrogen Chloride | 8.3 | 8.3 |
| Hydrogen Cyanide | 8.3 | 8.3 |
| Sulfur Dioxide | 16.7 | 16.7 |
| Hydrogen Sulfate | 16.7 | 16.7 |
| Chlorine | 1.7 | 1.7 |
| Phosgene | 0.3 | 0.3 |

*all values in ppm except Airborne Particulates in $mg/m^3$

The carbon monoxide (CO), nitric oxide (NO) and nitrogen dioxide ($NO_2$) levels of the gases produced in the 100 cubic foot tank for Samples #1–#5 are set forth in Table V. The gas samples were analyzed using FTIR at intervals of before deployment (background), 1, 5, 10, 15 and 20 minutes after deployment. Samples were transferred directly to the FTIR gas cell from the 100 cubic foot chamber via six feet of ¼ inch OD fluoropolymer tubing.

TABLE V

Gas Analysis
(Average of 3 Runs at Sample Times of 1, 5, 10, 15 and 20 minutes)

| Sample # | CO | NO | $NO_2$ |
|---|---|---|---|
| 1 | 172 | 12 | 2.4 |
| 2 | 163 | 12 | 2.1 |
| 3 | 202 | 19 | 3.8 |
| 4 | 224 | 17 | 3.4 |
| 5 | 239 | 16 | 3.3 |
| 6 | 286 | 11 | 2.6 |

Samples #1 and #2, which contained 16% by wt. mica and 15% by wt. mica, respectively, demonstrated reduced levels of CO, NO and $NO_2$ production compared to the generates that did not contain mica. The automobile industry requires that gas generants produce restricted levels of various reaction products as set forth in Table IV. The gas generants of the present invention can meet these standards.

EXAMPLE III

In this experiment, various fuels and levels of mica were evaluated in the gas generants of the present invention. The Samples were prepared in a manner similar to in Example I except the batch size was 500 gms, the components were ground separately, dry blended and pressed into strands for testing. The formulations for Samples #7–#11 are set forth in Table VI.

TABLE VI

| | | Values in Weight % | | | | |
|---|---|---|---|---|---|---|
| Sample # | | Fuel | $KNO_3$ | $Sr(NO_3)_2$ | $SiO_2$ | Mica+ |
| 7 | 116 | 5-AT - 28% | 7 | 39 | 1 | 25 |
| 8 | 117 | 5-AT - 36% | 9 | 49 | 1 | 5 |
| 9 | 118 | NTO* - 32% | 8 | 44 | 1 | 15 |
| 10 | 119 | K-AT** - 32% | 8 | 44 | 1 | 15 |
| 11 | 120 | $NaN_3$*** - 32% | 8 | 44 | 1 | 15 |

*NTO - Nitrotriazolone (3-nitro-1,2,4-triazol-5-one)
**K-AT = potassium salt of 5-aminotetrazole
***$NaN_3$ = sodium azide
+muscovite mica Instead of pelletizing the gas generants as in Example I, the generants compositions were formed into rectangular strands about 10.16 cm (4 in.) in length and about 0.63 cm (¼ in.) on each side. The sides of each strand were coated with an epoxy-based adhesive. Strands were placed in a stand burner bomb. The bomb was equipped with a pressure transducer, acoustic devices and mechanical wire burn through recorders. The strands were ignited, and pressure versus time was recorded. Burning time was calculated by the acoustic and mechanical devices. Burning rate was determined by dividing the length of each strand by its burning time. The burn rate for each Sample is presented in Table VII.

TABLE VII

| | Burn Rate of Sample 7–11 at 7585 KPa (1100 psi) | |
|---|---|---|
| | Burn Rate | |
| Sample # | (cm/sec.) | (in/sec.) |
| 7 | 0.95 | <0.374 |
| 8 | 2.44 | 0.961 |
| 9 | 0.94 | <0.37 |
| 10 | 2.51 | 0.99 |
| 11 | 3.25 | 1.28 |

While burn rates of greater than 1.27 cm/sec. (0.5 in/sec.) are desirable, for Samples #7 and #9 could be improved through manipulation of the fuel/oxidizer ratio.

The automobile industry may require in the future that gas generants produce restricted levels of various reaction products as set forth in Table IV. The gas generants of the present invention can presently meet these standards.

EXAMPLE IV

Burst Foil

In this experiment, various burst foil materials were evaluated in inflators using non-azide gas generants. Burst foils are used to seal the gas exit ports of the inflator housing to prevent absorption of atmospheric water by the generant pellets. The foils rupture upon ignition of the generant to allow gases to escape the inflator housing. Previous tests of inflators using aluminum burst foil with non-azide generants demonstrated that the aluminum foil was melting and burning.

Figure 3:
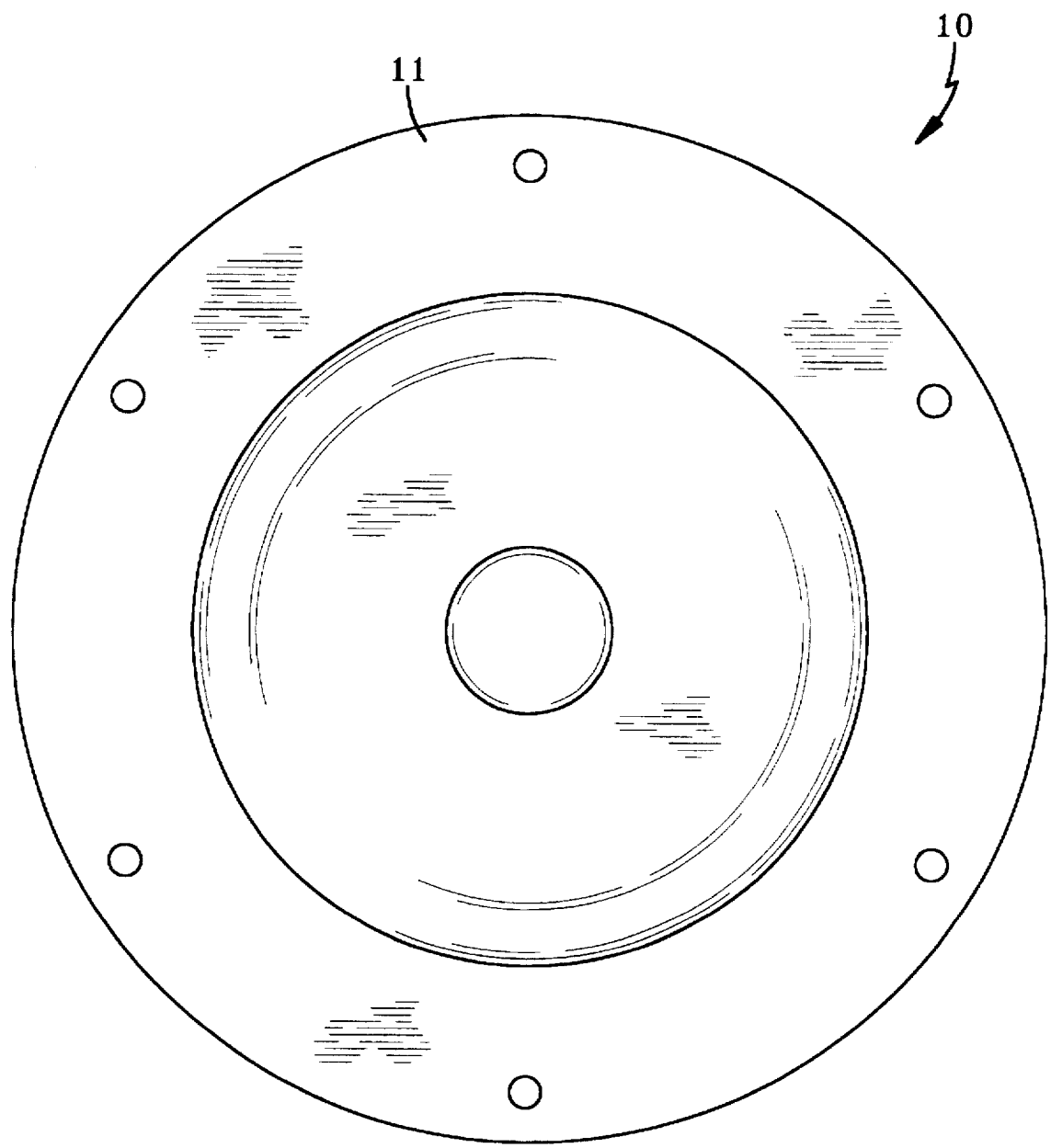
FIG. 3 is an end view of the gas generating device of FIG. 1.

The aluminum burst foil, upon melting, also contributes to the amount of particulates produced by the inflator. A series of 16 inflators were prepared that were identical, except for the use of a stainless steel burst foil (8 inflators), which were designated Configuration #1 an aluminum burst foil (8 inflators), which were designated Configuration #3. The generant used was Sample #1 and the re-useable housing set forth in FIG. 3 was employed. The aluminum foil was 0.127 mm thick and the stainless steel foil was 0.025 mm thick in order to provide identical burst pressures, which is the primary objective of the burst foil. Particulate production measured in the 60 liter tank evidenced a significant reduction when the burst foil was stainless steel.

Videos of the inflator ignition showed a significant reduction of incandescent particles exiting the inflators when a stainless steel burst foil was employed. Further, post ignition inspection of the inflators evidenced that the majority of the stainless steel foil remained inside the housing and was coated with a heavy accumulation of slag. In contrast, the aluminum burst foil was virtually gone from the inside of the housing.

Three inflators of each configuration were fired in the 60 liter tank for total particulate measurements, three of each were fired in the 100 ft.$^3$ tank for toxicity and airborne particulate analysis and two of each were fired in the open air for video recordation. The results are set forth in Tables VIII and IX.

TABLE VIII

| | Tests in 60 Liter Tank | | |
|---|---|---|---|
| Configuration | Total | pH | Average Total |
| 1-A | 1277 | 10 | 812 |
| 1-B | 567 | 10 | |
| 1-C | 591 | 10 | |
| 2-A | 1361 | 8 | 1506 |
| 2-B | 1235 | 8 | |
| 2-C | 1921 | 8 | |

TABLE IX

| | Tests in 100 ft$^3$ Tank | | |
|---|---|---|---|
| Configuration | CO | NO | $NO^2$ |
| 1-A | 240 | 19 | 3.2 |
| 1-B | 235 | 20 | 3.4 |
| 1-C | 237 | 19 | 3.8 |
| 2-A | 230 | 18 | 3.5 |
| 2-B | 244 | 20 | 3.5 |
| 2-C | 227 | 18 | 3.4 |

It would not be appropriate to compare the test results presented in Table IX to the test results presented in Table V. After the tests reported in Table V were conducted, but before the tests reported in Table IX were conducted, several alterations were made to the 100 ft$^3$ tank testing apparatus. The reconfiguration of the testing apparatus entailed items such as relocating controls, installing some new plumbing components and relocating some components of the testing apparatus. Furthermore, the fabric of the airbags employed in the test reported in Tables V and IX were different.

Industrial Applicability

The automobile industry is constantly searching for gas generants that produce an easily filterable slag, low particulate levels and reduced levels of undesirable gases. The industry is also in need of gas generants that do not use azide based generants to avoid the problems associated with azide toxicity. The present invention, while useful in azide based generants, is more specifically directed to the non-azide based generants. Thus, the use of 5–25 wt. % of mica in gas generants will address the needs of the industry and promote the use of non-azide fuels.

An additional aspect of this invention resides in the use of a stainless steel burst foil in inflators that contain non-azide generants.

Although the present invention has been disclosed in connection with a few preferred embodiments thereof, variations and modifications may be chosen by those skilled in the art without departing from the principles of the invention. All of these variations and modifications are considered to be within the spirit and scope of the present invention as disclosed in the foregoing description and defined by the appended claims.

We claim:

1. An airbag inflator comprising:
   (a) a metal housing;
   (b) a gas generant comprising greater than 5 and less than 25 wt. % of mica; and
   (c) combustion ports wherein said ports are sealed with a stainless steel foil.

2. The airbag inflator of claim 1 wherein said stainless steel foil is of a thickness of 0.01 to 0.20 mm, said foil further characterized by an adhesive on at least one surface of said foil.

3. The airbag inflator of claim 1 wherein said gas generant further comprises:
   (a) 15–70 wt. % of a fuel; and
   (b) 2–80 wt. % of an oxidizer.

4. The airbag inflator of claim 3 wherein the fuel is selected from alkali metal azides, alkaline earth metal azides, aminotetrazoles, and the metal salts thereof, tetrazoles and the metal salts thereof, bitetrazoles and the metal salts thereof, triazoles and the metal salts thereof, nitrates and mixtures thereof.

5. The airbag inflator of claim 3 wherein the oxidizer is selected from transition metal oxides; alkali metal nitrates, chlorates and perchlorates; alkaline earth metal nitrates, chlorates and perchlorates; ammonium nitrate; and mixtures thereof.

6. The airbag inflator of claim 3 wherein said fuel comprises 5-aminotetrazole and said oxidizer comprises potassium nitrate and strontium nitrate.

7. The airbag inflator of claim 6 wherein said fuel is 30–35 wt. % of said generant, said potassium nitrate is 5–10 wt. % of said generant and said strontium nitrate is 40–50 wt. % of said generant.

8. The airbag inflator of claim 3 wherein said mica is about 10–20 wt. % of said generant.

9. An airbag inflator comprising:
   (a) a metal housing;
   (b) a knitted wire filter;
   (c) a stainless steel burst foil having a thickness of 0.01 to 0.20; and
   (d) a gas generant comprising:
      (i) 20–40 wt. % of a fuiel selected from tetrazoles, triazoles and mixtures thereof;
      (ii) 20–80 wt. % of an oxidizer selected from transition metal oxides; alkali and alkaline earth metal nitrates, chlorates and perchlorates; ammonium nitrate; and mixtures thereof; and
      (iii) greater than 5 and less than 25 wt. % mica.

10. The airbag inflator of claim 9 wherein said gas generant comprises about 10–20 wt. % mica.

11. An airbag inflator comprising:
    (a) a metal housing;
    (b) a knitted wire filter; and
    (c) a gas generant comprising
       (i) 20–40 wt. % of a fuel selected from tetrazoles, triazoles and mixtures thereof;
       (ii) 20–80 wt. % of an oxidizer selected from transition metal oxides; alkali and alkaline earth metal nitrates, chlorates and perchlorates; ammonium nitrate; and mixtures thereof; and
       (iii) greater than 5 and less than 25 wt. % mica.

12. An airbag inflator according to claim 11 wherein said gas generant comprises 10–20 wt. % mica.

13. An airbag inflator according to claim 11 wherein said fuel is 30–35 wt. % of said generant and said oxidizer is a mixture of potassium nitrate at 5–10 wt. % and strontium nitrate at 40–50 wt. % of said generant.

* * * * *